(12) United States Patent
English et al.

(10) Patent No.: US 8,406,730 B1
(45) Date of Patent: Mar. 26, 2013

(54) POSSESSION CONFIDENCE METRIC FOR A WIRELESS COMMUNICATION DEVICE

(75) Inventors: Eric C. English, Lee's Summit, MO (US); Philip Martin Kunkel, Overland Park, KS (US); Jay Douglas Cole, Overland Park, KS (US); Wen Xue, Overland Park, KS (US); Talat Jamshidi, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 361 days.

(21) Appl. No.: 12/813,197

(22) Filed: Jun. 10, 2010

(51) Int. Cl.
*H04M 11/04* (2006.01)

(52) U.S. Cl. ............... 455/404.2; 455/404.1; 455/456.1; 455/456.2; 455/456.3

(58) Field of Classification Search ............... 455/404.1, 455/404.2, 456.1, 456.2, 456.3
See application file for complete search history.

(56) References Cited

U.S. PATENT DOCUMENTS

| | | | |
|---|---|---|---|
| 6,678,357 B2 | 1/2004 | Stumer et al. | |
| 6,799,049 B1 | 9/2004 | Zellner et al. | |
| 6,940,950 B2 | 9/2005 | Dickinson et al. | |
| 7,042,985 B1 | 5/2006 | Wright | |
| 7,260,186 B2 | 8/2007 | Zhu et al. | |
| 7,330,464 B2 | 2/2008 | Brouwer et al. | |
| 2005/0026589 A1 | 2/2005 | Holland et al. | |
| 2006/0188073 A1 | 8/2006 | Wright | |
| 2006/0281437 A1 | 12/2006 | Cook | |
| 2007/0015489 A1 | 1/2007 | Jennings | |
| 2007/0121598 A1 | 5/2007 | McGary | |
| 2007/0155399 A1* | 7/2007 | Alberth et al. | 455/456.1 |
| 2007/0242660 A1 | 10/2007 | Xu | |
| 2007/0263641 A1 | 11/2007 | Yee | |
| 2008/0101552 A1 | 5/2008 | Khan et al. | |
| 2008/0125077 A1 | 5/2008 | Velazquez et al. | |
| 2008/0132198 A1 | 6/2008 | Dayar et al. | |
| 2010/0198826 A1* | 8/2010 | Petersen et al. | 707/737 |
| 2012/0157127 A1* | 6/2012 | Ferren et al. | 455/456.6 |

* cited by examiner

*Primary Examiner* — Kathy Wang-Hurst

(57) ABSTRACT

A communication system comprises a voice over internet protocol (VoIP) service system and a location determination system. The VoIP service system is configured to receive a call request for an emergency service from a user, process the call request to determine a wireless communication device identifier associated with the user, and transfer a location request for delivery to a location determination system in a wireless network serving the wireless communication device. The location determination system is configured to receive the location request, process the location request to determine a location of the wireless communication device and a possession confidence metric that indicates a level of confidence that the user is in possession of the wireless communication device, and transfer a location response for delivery to the VoIP service system. The VoIP service system is configured to, if the possession confidence metric exceeds a threshold, transfer the call request for the emergency service for delivery to an emergency service provider that serves the location.

20 Claims, 6 Drawing Sheets

POSSESSION CONFIDENCE METRIC FOR A WIRELESS COMMUNICATION DEVICE

TECHNICAL BACKGROUND

Conventional telecommunication networks typically include many calling areas to cover a particular geographic area, with communication trunks used to transfer calls between different calling areas. These communication trunks and calling areas can be operated by different companies, or exchange carriers, with some communication trunks used to interconnect different calling areas, often over long distances.

Voice over Internet Protocol (VoIP) technology allows phone calls to be routed over packet networks, such as the Internet, instead of over the calling areas and trunks of conventional telecommunication networks. Wireless communication devices operating in wireless communication networks are also able to place calls using VoIP technology. For example, some calls initiated by wireless communication devices may use VoIP to connect to other wireless communication devices, or to non-wireless telecommunication devices, such as conventional telephones communicating over the public switched telephone network (PSTN).

Telecommunications carriers are required by government regulations to provide emergency calling services to their customers. In North America, 9-1-1 is the official emergency phone number that callers can use to reach dispatch personnel at a public safety answering point (PSAP). When a person calls 9-1-1 from a telephone, the call is typically routed by a communication service provider to receiving equipment at a PSAP facility. A dispatcher at the facility answers the call and assists the caller with the emergency.

Frequently, PSAP operators must dispatch various types of first responder personnel to the scene of an emergency, such as firemen, police, or paramedics, to render assistance based upon the emergency communicated by the caller. Therefore, a critical concern to communication service providers is that an emergency call is routed to the appropriate PSAP that serves the location of the caller. However, determining the location of the caller can be difficult, particularly with regard to VoIP technology.

OVERVIEW

A method of operating a communication system comprises receiving a location request for a wireless communication device served by a wireless network, processing the location request to determine a location of the wireless communication device and a possession confidence metric that indicates a level of confidence that a user is in possession of the wireless communication device, and transferring a location response, wherein the location response comprises the location of the wireless communication device and the possession confidence metric.

A method of operating a communication system comprises receiving a call request for an emergency service from a user, processing the call request to determine a wireless communication device identifier associated with the user, transferring a location request for delivery to a wireless network serving the wireless communication device, receiving a location response transferred from the wireless network, wherein the location response comprises a location of the wireless communication device and a possession confidence metric that indicates a level of confidence that the user is in possession of the wireless communication device, and if the possession confidence metric exceeds a threshold, transferring the call request for the emergency service for delivery to an emergency service provider that serves the location.

A communication system comprises a voice over internet protocol (VoIP) service system and a location determination system. The VoIP service system is configured to receive a call request for an emergency service from a user, process the call request to determine a wireless communication device identifier associated with the user, and transfer a location request for delivery to a location determination system in a wireless network serving the wireless communication device. The location determination system is configured to receive the location request, process the location request to determine a location of the wireless communication device and a possession confidence metric that indicates a level of confidence that a user is in possession of the wireless communication device, and transfer a location response for delivery to the VoIP service system, wherein the location response comprises the location of the wireless communication device and the possession confidence metric. The VoIP service system is configured to, if the possession confidence metric exceeds a threshold, transfer the call request for the emergency service for delivery to an emergency service provider that serves the location.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
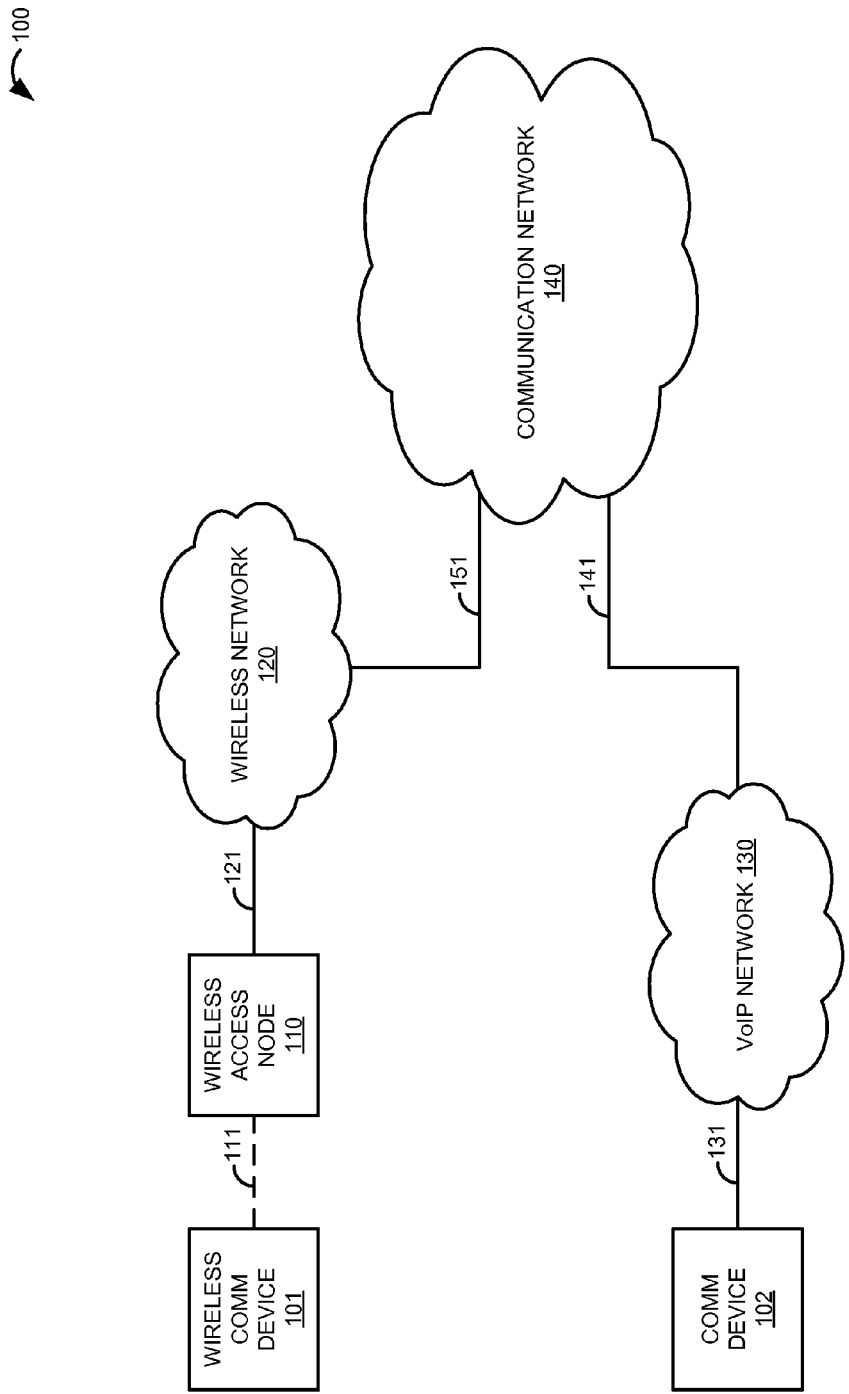
FIG. 1 is a block diagram that illustrates a communication system.

FIG. 1 is a block diagram that illustrates communication system 100. Communication system 100 includes wireless communication device 101, communication device 102, wireless access node 110, wireless network 120, voice over internet protocol (VoIP) network 130, and communication network 140. Wireless communication device 101 communicates with wireless access node 110 over wireless communication link 111. Wireless access node 110 is in communication with wireless network 120 over communication link 121. Communication device 102 is in communication with VoIP network 130 over communication link 131. VoIP network 130 communicates with communication network 140 over communication link 141. Likewise, wireless network 120 communicates with communication network 140 over communication link 151.

Figure 2:
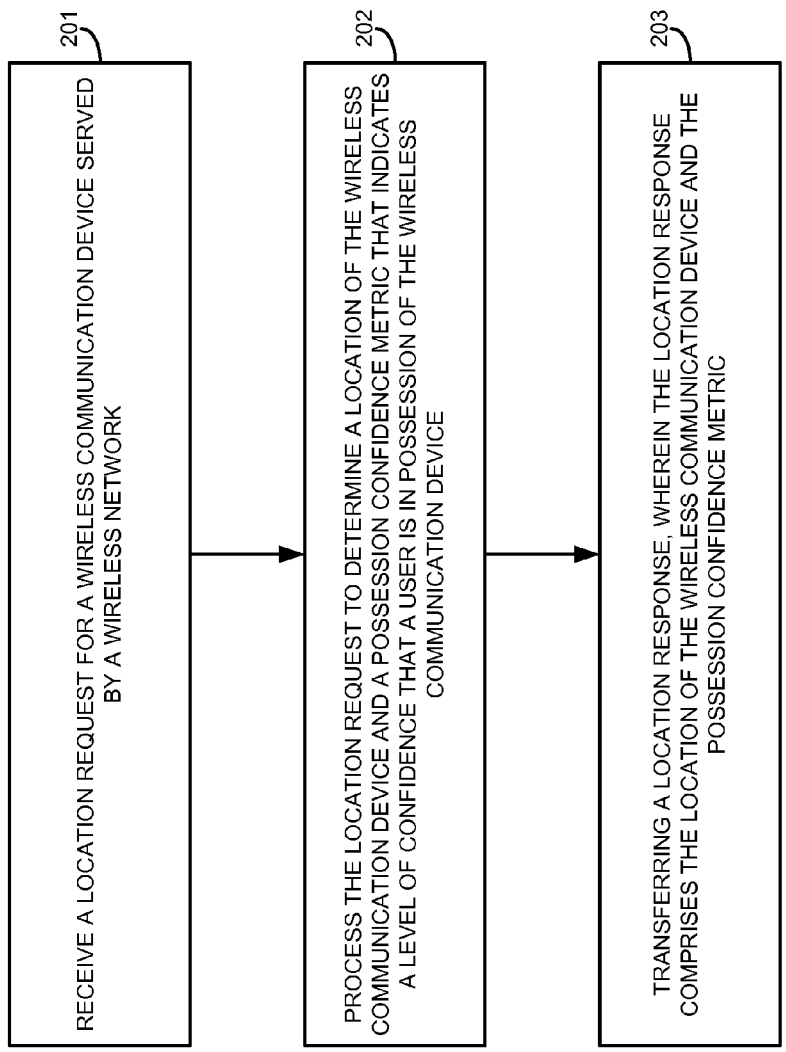
FIG. 2 is a flow diagram that illustrates an operation of the communication system.

FIG. 2 is a flow diagram that illustrates an operation of communication system 100. The steps of the operation are indicated below parenthetically. In FIG. 2, wireless network 120 receives a location request for wireless communication device 101 served by wireless network 120 (201). For example, the location request could be received by a location determination system, a virtual positioning center, or any other system, device, or node associated with wireless network 120. Typically, the location request is received from a system that requires the location of wireless communication device 101, such as a network element associated with VoIP network 130, for example. However, wireless network 120 could receive the location request from any network, system, or device, including networks and systems not shown in FIG. 1.

The location request is processed to determine a location of wireless communication device 101 and a possession confidence metric that indicates a level of confidence that a user is in possession of wireless communication device 101 (202). The location of wireless communication device 101 may be determined using various techniques, such as satellite positioning using the Global Positioning System (GPS), trilateration, multilateration, or triangulation, cell identification methods such as Cell of Origin (COO) and control plane locating, identification of a switch that registered wireless communication device 101 or a node serving device 101, or by simply retrieving location information from a database. In some examples, the location could also include a location confidence metric that indicates a level of confidence that wireless communication device 101 is located at the location. The location confidence metric could be based on the accuracy of the location technique utilized to locate device 101.

In addition to the location of wireless communication device 101, a possession confidence metric is determined that indicates a level of confidence that a user of wireless communication device 101 is in possession of device 101 (202). The possession confidence metric could be based on several factors that may be monitored or tracked by wireless network 120. In some examples, the possession confidence metric could be determined by processing a mobility factor of wireless communication device 101. The mobility factor indicates an amount of mobility of wireless communication device 101 that wireless network 120 has detected. For example, if a user of wireless communication device 101 is traveling in a vehicle with device 101, the mobility factor of device 101 will be relatively high. The mobility of wireless communication device 101 may be determined by wireless network 120 based on frequent location changes, handoffs between wireless access nodes, or other network interactions that indicate to wireless network 120 that device 101 is in motion. Typically, the mobility factor has a direct relationship with the possession confidence metric, in that a higher mobility factor is assumed to indicate a higher likelihood that a user has possession of device 101.

Another factor that wireless network 120 may use to determine the possession confidence metric is a most recent registration time when wireless communication device 101 registered with wireless network 120. For example, the last time that wireless communication device 101 registered with wireless network 120 could provide insight into whether the user is in possession of device 101, such as whether device 101 was recently powered on.

In some examples, wireless network 120 tracks and analyzes the usage history of wireless communication device 101 to determine the possession confidence metric. The usage history of wireless communication device 101 could comprise the historical utilization of device 101 by the user, including the location, time of day, and duration of usage, quantity of usage, types of usage (such as data transfers, text messages, or voice calls), or other network activity performed by the user with device 101. In some examples, the usage history is separated into long-term history and short-term history, which can be based on predetermined or threshold values, where the short-term usage history is more recent than the long-term usage history. For example, historical usage from a previous year or previous month could comprise long-term usage history, while usage from the current month or current week could comprise short-term usage history. In addition, current usage can be determined, again based on predetermined or threshold values. Typically, current usage comprises usage that is more recent than the short-term usage history. For example, current usage could comprise any usage of device 101 during the current hour or current day.

The usage history could then be compared with the current usage to determine the possession confidence factor. In some examples, wireless network 120 may periodically process the usage history to determine a usage profile for wireless communication device 101. The usage profile could indicate typical usage patterns for wireless communication device 101, such as locations, times of the day, and days of the week when device 101 is typically used. The usage history or the usage profile could be compared with current usage and/or the location of device 101 to determine whether the current usage or the current location matches a pattern of usage indicated by the usage history. For example, if the user frequently uses wireless communication device 101 at the office during the workweek, the usage history would indicate that the user typically uses device 101 from the same location during typical work hours. Then, if the location of wireless communication device 101 matches the location where device 101 is typically used during the workweek, and the location request is received during the typical work hours, wireless network 120 may determine that the user of wireless communication device 101 is likely in possession of device 101, resulting in a higher possession confidence metric. However, if the location of wireless communication device 101 matches the location where device 101 is typically used during the workweek, but the location request is received during the weekend when device 101 is typically operating at a different location, the possession confidence metric will be reduced, since perhaps the user forgot wireless communication device 101 at the office over the weekend.

In some examples, wireless network 120 could determine whether wireless communication device 101 established a communication session with wireless network 120 within a threshold amount of time before receiving the location request. For example, the threshold amount of time could be set to one hour, so that if the user of wireless communication device 101 utilized device 101 within one hour before receiving the location request to establish a communication session, wireless network 120 assumes the user is likely in possession of device 101, resulting in a higher possession confidence metric. A communication session could comprise a data transfer, voice call, sending or receiving a Short Message Service (SMS) text message, or any other usage activity observed by wireless network 120, for example.

Referring again to FIG. 2, once the location of wireless communication device 101 and the possession confidence metric is determined, a location response is transferred (203).

The location response comprises the location of wireless communication device 101 and the possession confidence metric (203). Typically, the location response is transferred in response to the location request, in that the location response is transferred for delivery to the network, system, device, or other element from which wireless network 120 received the location request. Advantageously, by including the possession confidence metric along with the location of wireless communication device 101, the recipient of the location response can better determine the likelihood that the user of wireless communication device 101 is actually located at the same location as device 101.

Figure 3:
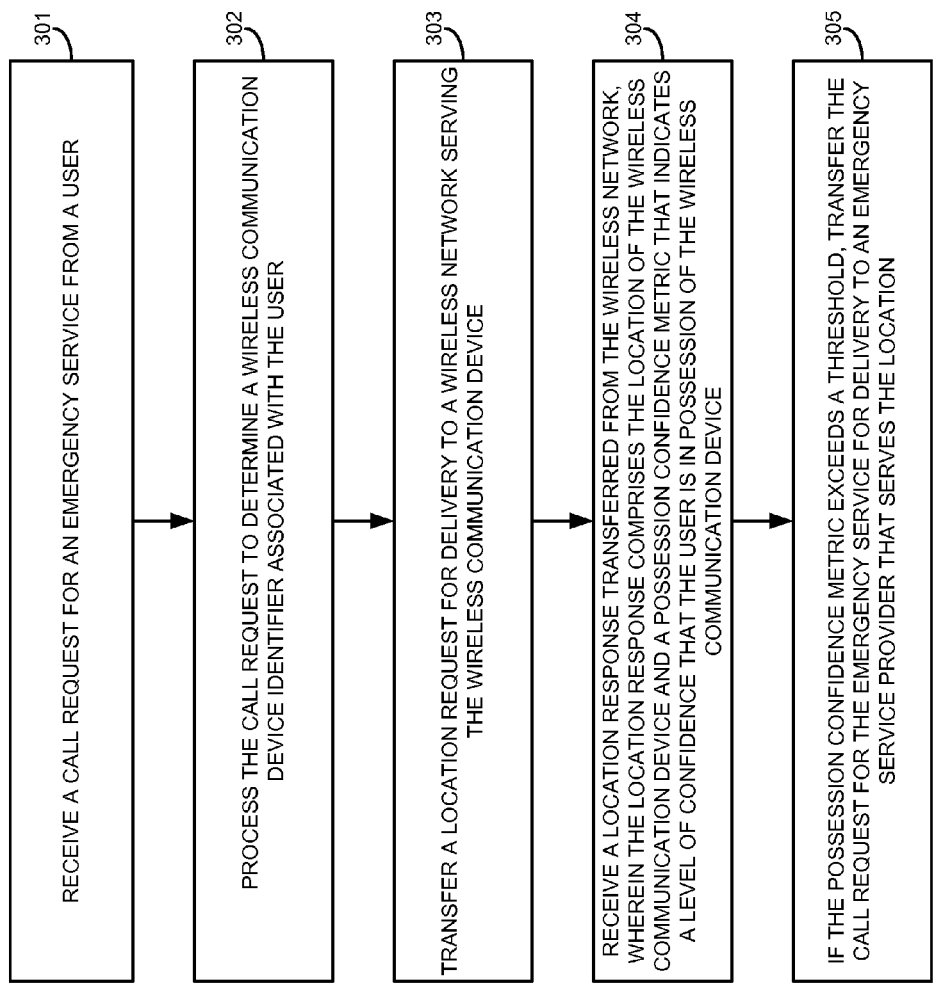
FIG. 3 is a flow diagram that illustrates an operation of the communication system.

FIG. 3 is a flow diagram that illustrates an operation of communication system 100. The steps of the operation are indicated below parenthetically. In FIG. 3, a call request for an emergency service is received from a user (301). Typically, VoIP network 130 receives the call request for the emergency service from a user of communication device 102, although the call request could also be received from wireless communication device 101. In some examples, a VoIP service system in VoIP network 130 receives the call request for the emergency service. In FIG. 1, the same user is associated with both wireless communication device 101 and communication device 102, although communication device 102 may be omitted in some examples, such as when wireless communication device 101 is configured to utilize VoIP network 130 for voice calls. In some examples, the call request for the emergency service could comprise the user calling '9-1-1' to request emergency assistance.

After receiving the call request for the emergency service, the call request is processed to determine a wireless communication device identifier associated with the user (302). In some examples, if the call request is received by VoIP network 130 from communication device 102, VoIP network 130 may process the call request by looking up a wireless communication device identifier associated with communication device 102 in a database. For example, the user of communication device 102 could provide a telephone number or other identifier of wireless communication device 101 to VoIP network 130 when establishing service for communication device 102, and VoIP network 130 could associate this identifier with communication device 102 in the database. In this manner, VoIP network 130 could look up the telephone number of communication device 102 in the database upon receiving the call request and determine the wireless communication device identifier of wireless device 101 from the relational database entry.

Once the wireless communication device identifier of device 101 is determined, a location request is transferred for delivery to wireless network 120 that serves wireless communication device 101 (203). The location request indicates to wireless network a request for the location of wireless communication device 101. In some examples, the location request could be received by a location determination system, a virtual positioning center, or any other system, device, or node associated with wireless network 120. Typically, the location request comprises the wireless communication device identifier. In some examples, the location request could comprise a flag, bit, or other notice to indicate to wireless network 120 that a possession confidence metric is requested along with the location.

In response to the location request, a location response transferred from wireless network 120 is received (304). The location response comprises the location of wireless communication device 101 and a possession confidence metric that indicates a level of confidence that the user is in possession of wireless communication device 101 (304). In some examples, the location response also comprises a location confidence metric that indicates a level of confidence that wireless communication device 101 is located at the location. For example, different levels of accuracy may be achieved depending on the technique used to determine the location of wireless communication device 101, and the accuracy of the location determination could be represented by the location confidence metric. Thus, both the possession confidence metric and the location confidence metric provide insight into the likelihood that the user of wireless communication device 101 is actually located at the location indicated in the location response.

If the possession confidence metric exceeds a threshold, the call request for the emergency service is transferred for delivery to an emergency service provider that serves the location (305). The threshold could comprise any level of possession confidence that the network processing the call request deems acceptable to support the assumption that the user is actually located at the location indicated in the location response. For example, if the possession confidence metric comprises a percentage, the threshold could comprise 75%, where any possession confidence metric exceeding 75% would result in the call request being transferred for delivery to an emergency service provider associated with the location. In some examples, the emergency service provider could comprise a Public Safety Answering Point (PSAP), police service, fire service, emergency medical service, Government Emergency Telecommunications Service (GETS), or some other emergency service provider—including combinations thereof.

Advantageously, when a call request for an emergency service is received from a user, the location of wireless communication device 101 associated with the user is determined, along with a possession confidence metric. Using the possession confidence metric, a communication service provider that receives the call request for the emergency service can determine whether the user is likely in possession of wireless communication device 101, and thus, also located at the location of device 101. In this manner, the communication service provider can transfer the call request for delivery to an emergency service provider that serves the location of device 101, thereby connecting the user to the appropriate emergency service personnel who are best suited to provide assistance to the user.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Communication device 102 comprises hardware and circuitry programmed to function as a telecommunications device. Communication device 102 may comprise a communication interface, user interface, memory device, software, processing circuitry, or some other communication components. For example, communication device 102 could comprise a telephone, wireless transceiver, mobile phone, cellular phone, smartphone, computer, terminal adapter, broadband modem, embedded multimedia terminal adapter (eMTA), personal digital assistant (PDA), e-book, game console, mobile Internet device, network interface card, media player, or some communication apparatus—including combinations thereof. In some examples, communication device 102 could comprise a wireless communication device comprising Radio Frequency (RF) communication circuitry and an antenna. In other examples, wireless communication device 101 and communication device 102 could comprise the same device.

Wireless network 120 comprises the core network of a wireless communication provider, and could include routers, gateways, telecommunication switches, servers, processing systems, or other communication equipment and systems for providing communication and data services. Wireless network 120 could comprise wireless communication nodes, telephony switches, Internet routers, network gateways, computer systems, communication links, or some other type of communication equipment—including combinations thereof. Wireless network 120 may also comprise optical networks, asynchronous transfer mode (ATM) networks, packet networks, radio access networks (RAN), metropolitan-area networks (MAN), or other network topologies, equipment, or systems—including combinations thereof. Wireless network 120 may be configured to communicate over metallic, wireless, or optical links. Wireless network 120 may be configured to use time-division multiplexing (TDM), Internet Protocol (IP), Ethernet, optical networking, wireless protocols, communication signaling, or some other communication format—including combinations thereof. In some examples, wireless network 120 includes further access nodes and associated equipment for providing communication services to many wireless communication devices across a large geographic region.

VoIP network 130 comprises multiple network elements such as routers, gateways, switches, servers, processing systems, or other communication equipment and systems for providing communication and data services via data packets. VoIP network 130 could comprise Internet routers, network gateways, computer systems, communication links, media gateways, media gateway controllers (MGC), packet inspection equipment, or some other type of communication equipment—including combinations thereof. VoIP network 130 may also comprise a packet network, a voice-over-packet network, a wireless communication network, an optical network, an enterprise network, a local area network (LAN), wide area network (WAN), metropolitan area network (MAN), session initiation protocol (SIP) trunks, or other network topologies, equipment, or systems—including combinations thereof. VoIP network 130 may be configured to communicate over metallic, wireless, or optical links. VoIP network 130 may be configured to communicate using IP, Ethernet, optical networking, communication signaling, SIP signaling, or some other communication format—including combinations thereof.

Communication network 140 comprises multiple network elements such as routers, gateways, telecommunication switches, servers, processing systems, or other communication equipment and systems for providing communication and data services. Communication network 140 could comprise wireless communication nodes, telephony switches, Internet routers, network gateways, computer systems, communication links, or some other type of communication equipment—including combinations thereof. Communication network 140 may also comprise optical networks, asynchronous transfer mode (ATM) networks, packet networks, LAN, MAN, WAN, or other network topologies, equipment, or systems—including combinations thereof. Communication network 140 may be configured to communicate over metallic, wireless, or optical links. Communication network 140 may be configured to use TDM, IP, Ethernet, optical networking, wireless protocols, communication signaling, or some other communication format—including combinations thereof. In some examples, communication network 140 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, 141, and 151 use metal, air, space, optical fiber such as glass or plastic, or some other material as the transport media—including combinations thereof. Communication links 121, 131, 141, and 151 could use various communication protocols, such as TDM, IP, Ethernet, telephony, optical networking, hybrid fiber coax (HFC), communication signaling, wireless protocols, or some other communication format—including combinations thereof. Communication links 121, 131, 141, and 151 may be direct links or could include intermediate networks, systems, or devices.

Figure 4:
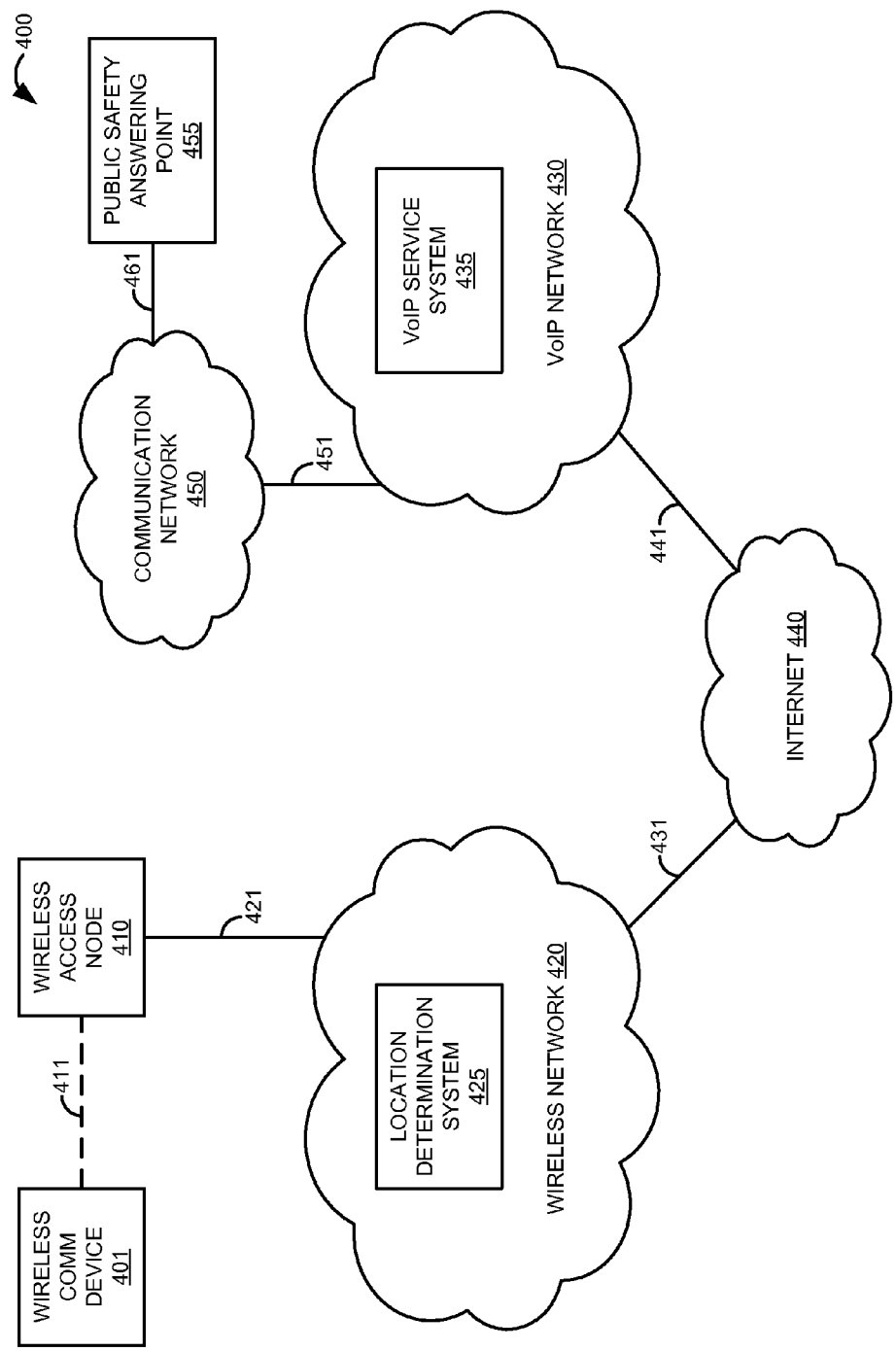
FIG. 4 is a block diagram that illustrates a communication system in an exemplary embodiment.

FIG. 4 is a block diagram that illustrates communication system 400 in an exemplary embodiment. Communication system 400 includes wireless communication device 401, wireless access node 410, wireless network 420, voice over internet protocol (VoIP) network 430, Internet 440, communication network 450, and Public Safety Answering Point (PSAP) 455. Wireless network 420 includes location determination system 425. VoIP network 430 includes VoIP service system 435. Wireless communication device 401 communicates with wireless access node 410 over wireless communication link 411. Wireless access node 410 is in communication with wireless network 420 over communication link 421. Wireless network 420 communicates with Internet 440 over communication link 431. Likewise, VoIP network 430 is in communication with Internet 440 over communication link 441. VoIP network 430 also communicates with communication network 450 over communication link 451. Communication network 450 is in communication with PSAP 455 over communication link 461. In communication system 400, wireless communication device 401 is capable of placing VoIP calls via VoIP network 430.

Figure 5:
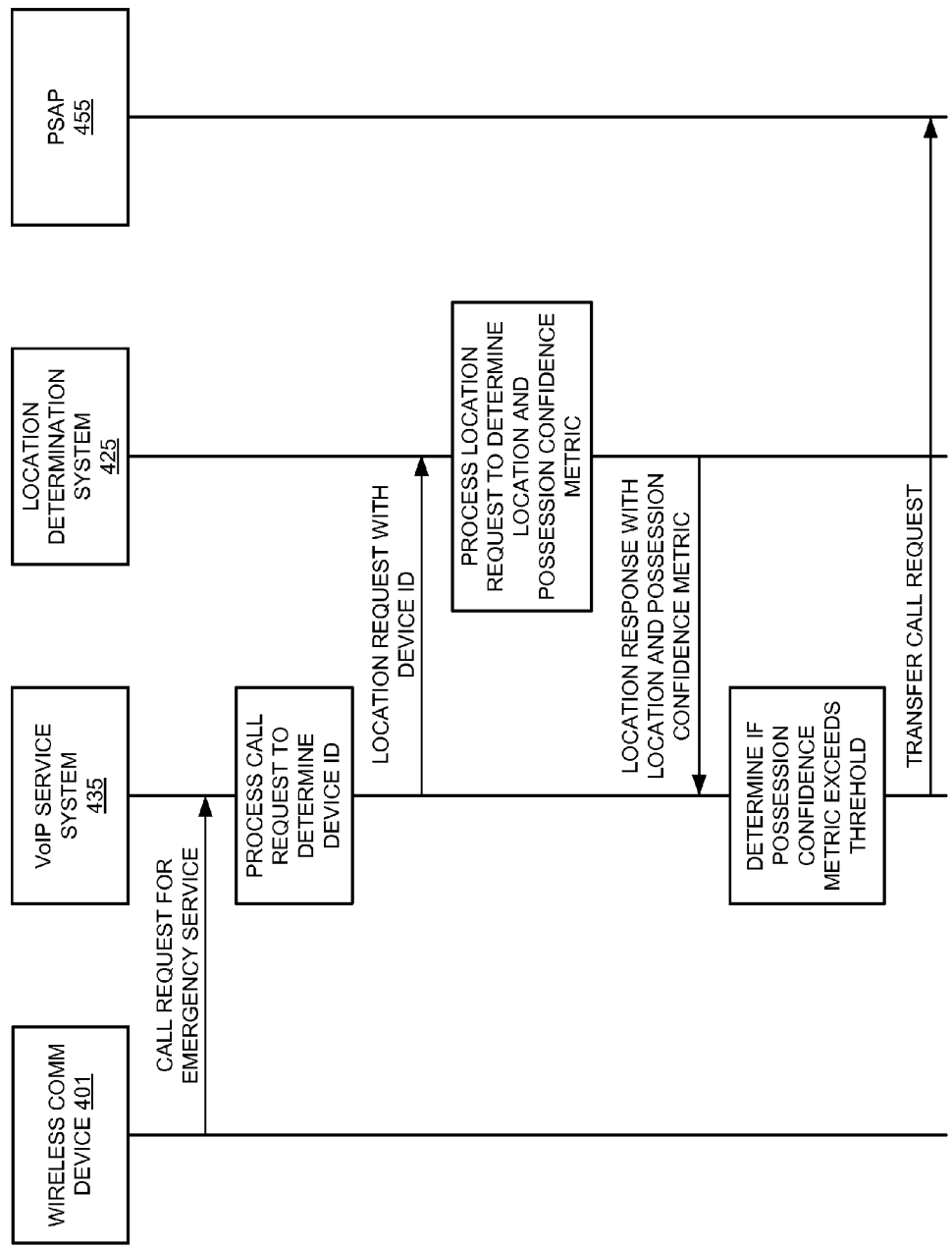
FIG. 5 is a sequence diagram that illustrates an operation of the communication system in an exemplary embodiment.

FIG. 5 is a sequence diagram that illustrates an operation of communication system 400 in an exemplary embodiment. The sequence begins when wireless communication device 401 transfers a call request for an emergency service to VoIP service system 435. In this case, the user of wireless communication device 401 calls '9-1-1' on wireless communication device 401 to place a VoIP call requesting the emergency service.

VoIP service system 435 receives the call request for the emergency service from wireless communication device 401. Since the call request is for an emergency service, VoIP service system 435 must determine the location of wireless communication device 401 in order to determine the appropriate emergency service provider for transferring the call (PSAP 455 in this case). To determine the location of wireless communication device 401, VoIP service system 435 processes the call request to determine a device identifier of wireless communication device 401. In this case, the user of wireless communication device 401 has provided a device identifier of wireless communication device 401 to VoIP service system 401 upon registering for VoIP service, such as a telephone number, electronic serial number (ESN), mobile station identifier (MSID), or some other identifier that uniquely identifies wireless communication device 401 to wireless network 420. Thus, VoIP service system 435 translates the calling party number included in the call request to the device identifier that identifies wireless communication device 401, and transfers a location request to location determination system 425 in wireless network 420. In some examples, the calling party number may be used as the wireless communication device identifier.

The location request transferred from VoIP service system 435 for delivery to location determination system 425 includes the device identifier of wireless communication device 401. In addition to requesting the location of wireless communication device 401, the location request includes a request for a possession confidence metric that indicates a level of confidence that the user is in possession of device 401, which may be indicated with a special possession confidence request bit, flag, metadata, or other indicator. In response to the location request, location determination system 425 processes the location request to determine the location of wireless communication device 401 and the possession confidence metric. Location determination system 425 may determine the possession confidence metric by several factors, including whether device 401 is currently powered on or off, recent communication sessions or registration attempts performed by device 401, a mobility factor that indicates a level of recent mobility of device 401, and the usage history of device 401. The usage history may be used to determine whether the present location or present usage of device 401 observed by wireless network 420 matches typical usage patterns in both the short-term and long-term. Different weights and scoring techniques may be used on the various factors to ultimately arrive at the possession confidence metric. For example, short-term usage history may be given a higher weight than long-term usage history, or vice versa. In addition, the amount of usage history available to location determination system 425 may influence the possession confidence metric, with longer usage history data (such as greater than one year) resulting in a higher possession confidence metric if the current usage matches the historical data.

Once location determination system 425 determines the location of wireless communication device 401 and the possession confidence metric, location determination system 425 transfers a location response to VoIP service system 435. The location response comprises the location of wireless communication device 401 and the possession confidence metric. VoIP service system 435 processes the location response to determine if the possession confidence metric exceeds a threshold. The threshold could comprise any value set by VoIP service system 435 that represents an acceptable level of confidence that the user is in possession of wireless communication device 401, and therefore, also located at the location of device 401. This example assumes the threshold is 85% and the possession confidence metric received in the location response is 90%. Thus, since the possession confidence metric exceeds the threshold, VoIP service system 435 transfers the call request for delivery to PSAP 455 that serves the location where wireless communication device 401 is presently located.

Advantageously, when VoIP service system 435 receives a call request for an emergency service, the location of wireless communication device 401 can be requested along with a possession confidence metric. The possession confidence metric provides a useful indicator to VoIP service system 435 in order to determine the likelihood that the user is located at the same location as wireless communication device 401. If the possession confidence metric is high enough, VoIP service system 435 may transfer the call request for delivery to PSAP 455 that serves the present location of wireless communication device 401 with a high degree of confidence that the user is also located at that location. In this manner, PSAP 455 receives the call request for the emergency service and is able to quickly render the appropriate assistance for the user of wireless communication device 401.

Figure 6:
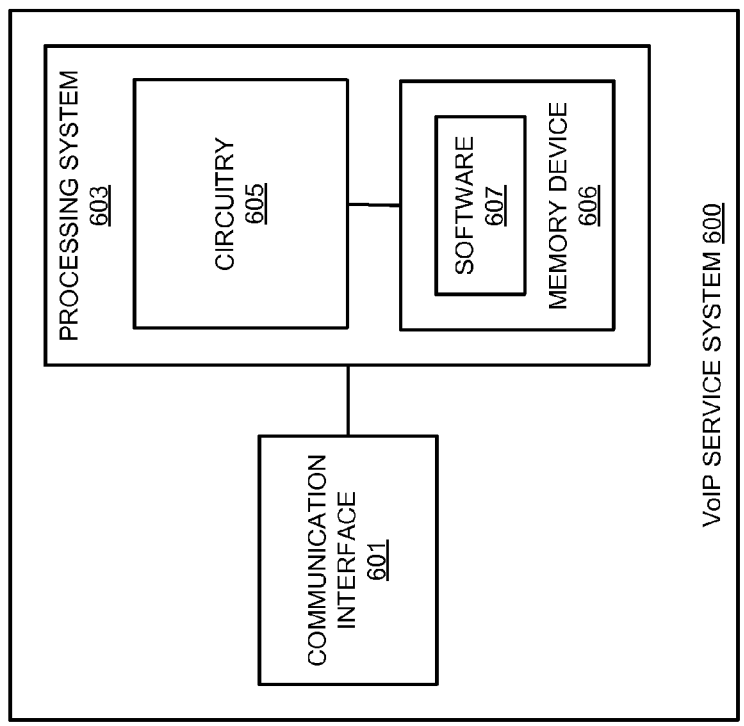
FIG. 6 is a block diagram that illustrates a VoIP service system.

FIG. 6 is a block diagram that illustrates VoIP service system 600. VoIP service system 600 provides an example of VoIP service system 435, although system 435 may use alternative configurations. VoIP service system 600 comprises communication interface 601 and processing system 603. Processing system 603 is linked to communication interface 601. Processing system 603 includes processing circuitry 605 and memory device 606 that stores operating software 607.

Communication interface 601 comprises components that communicate over communication links, such as network cards, ports, RF transceivers, processing circuitry and software, or some other communication components. Communication interface 601 may be configured to communicate over metallic, wireless, or optical links. Communication interface 601 may be configured to use SIP, TDM, IP, Ethernet, optical networking, wireless protocols, communication signaling, or some other communication format—including combinations thereof. Communication interface 601 is configured to receive a call request for an emergency service from a user, transfer a location request for delivery to a location determination system in a wireless network serving a wireless communication device, and transfer the call request for the emergency service for delivery to an emergency service provider that serves a location.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate as described herein for VoIP service system 435. In particular, operating software 607 directs processing system 603 to direct communication interface 601 to receive a call request for an emergency service from a user and transfer a location request for delivery to a location determination system in a wireless network serving a wireless communication device. In addition, operating software 607 directs processing system 603 to process the call request to determine a wireless communication device identifier associated with the user. Operating software 607 also directs processing system 603 to determine if the possession confidence metric exceeds a threshold, and if the possession confidence metric exceeds the threshold, to direct communication interface 601 to transfer the call request for the emergency service for delivery to an emergency service provider that serves the location.

Figure 7:
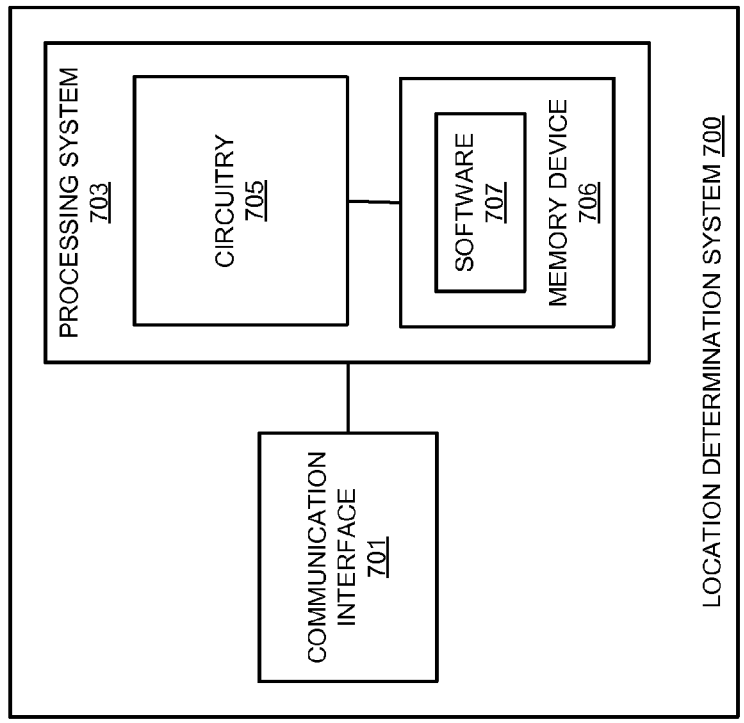
FIG. 7 is a block diagram that illustrates a location determination system.

FIG. 7 is a block diagram that illustrates location determination system 700. Location determination system 700 provides an example of location determination system 425, although system 425 may use alternative configurations. Location determination system 700 comprises communication interface 701 and processing system 703. Processing system 703 is linked to communication interface 701. Processing system 703 includes processing circuitry 705 and memory device 706 that stores operating software 707.

Communication interface 701 comprises components that communicate over communication links, such as network cards, ports, RF transceivers, processing circuitry and software, or some other communication components. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. Communication interface 701 is configured to receive a location request and transfer a location response for delivery to a VoIP service system, wherein the location response comprises a location of a wireless communication device and a possession confidence metric.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate as described herein for location determination system 425. In particular, operating software 707 directs processing system 703 to direct communication interface 701 to receive a location request. Further, operating software 707 directs processing system 703 to process the location request to determine a location of a wireless communication device and a possession confidence metric that indicates a level of confidence that a user is in possession of the wireless communication device. Finally, operating software 707 directs processing system 703 to direct communication interface 701 to transfer a location response for delivery to a VoIP service system, wherein the location response comprises the location of the wireless communication device and the possession confidence metric.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   receiving a location request for a wireless communication device served by a wireless network, wherein the location request is associated with a call request for an emergency service;
   processing the location request to determine a location of the wireless communication device and a possession confidence metric that indicates a level of confidence that a user is in possession of the wireless communication device, wherein the possession confidence metric assigns a higher weight to short-term usage history and a lower weight to long-term usage history; and
   transferring a location response comprising the location of the wireless communication device and the possession confidence metric, wherein the call request for the emergency service is transferred for delivery to an emergency service provider that serves the location if the possession confidence metric exceeds a threshold.

2. The method of claim 1 wherein processing the location request to determine the possession confidence metric comprises processing a mobility factor of the wireless communication device to determine the possession confidence metric.

3. The method of claim 1 wherein processing the location request to determine the possession confidence metric comprises determining a most recent registration time when the wireless communication device registered with the wireless network to determine the possession confidence metric.

4. The method of claim 1 wherein processing the location request to determine the possession confidence metric comprises processing a usage history of the wireless communication device to determine the possession confidence metric.

5. The method of claim 4 wherein processing the usage history to determine the possession confidence metric comprises processing a short-term usage history to determine the possession confidence metric.

6. The method of claim 4 wherein processing the usage history to determine the possession confidence metric comprises processing a long-term usage history to determine the possession confidence metric.

7. The method of claim 4 wherein processing the usage history to determine the possession confidence metric comprises determining whether the wireless communication device established a communication session with the wireless network within a threshold amount of time before receiving the location request.

8. A method of operating a communication system, the method comprising:
- receiving a call request for an emergency service from a user;
- processing the call request to determine a wireless communication device identifier associated with the user;
- transferring a location request for delivery to a wireless network serving the wireless communication device;
- receiving a location response transferred from the wireless network, wherein the location response comprises a location of the wireless communication device and a possession confidence metric that indicates a level of confidence that the user is in possession of the wireless communication device, wherein the possession confidence metric assigns a higher weight to short-term usage history and a lower weight to long-term usage history; and
- if the possession confidence metric exceeds a threshold, transferring the call request for the emergency service for delivery to an emergency service provider that serves the location.

9. The method of claim 8 wherein receiving the call request for the emergency service from the user comprises receiving the call request for the emergency service from the user in a voice over internet protocol (VoIP) service system.

10. The method of claim 8 wherein the location response comprises a location confidence metric that indicates a level of confidence that the wireless communication device is located at the location.

11. The method of claim 8 wherein the possession confidence metric is based on a mobility factor of the wireless communication device.

12. The method of claim 8 wherein the possession confidence metric is based on a most recent registration time when the wireless communication device registered with the wireless network.

13. The method of claim 8 wherein the possession confidence metric is based on a usage history of the wireless communication device.

14. The method of claim 8 wherein the emergency service provider comprises a public safety answering point.

15. A communication system comprising:
- a voice over internet protocol (VoIP) service system configured to receive a call request for an emergency service from a user, process the call request to determine a wireless communication device identifier associated with the user, and transfer a location request for delivery to a location determination system in a wireless network serving the wireless communication device;
- the location determination system configured to receive the location request, process the location request to determine a location of the wireless communication device and a possession confidence metric that indicates a level of confidence that the user is in possession of the wireless communication device, wherein the possession confidence metric assigns a higher weight to short-term usage history and a lower weight to long-term usage history, and transfer a location response for delivery to the VoIP service system, wherein the location response comprises the location of the wireless communication device and the possession confidence metric; and
- the VoIP service system configured to, if the possession confidence metric exceeds a threshold, transfer the call request for the emergency service for delivery to an emergency service provider that serves the location.

16. The system of claim 15 wherein the location response comprises a location confidence metric that indicates a level of confidence that the wireless communication device is located at the location.

17. The system of claim 15 wherein the location determination system configured to process the location request to determine the possession confidence metric comprises the location determination system configured to process a mobility factor of the wireless communication device to determine the possession confidence metric.

18. The system of claim 15 wherein the location determination system configured to process the location request to determine the possession confidence metric comprises the location determination system configured to determine a most recent registration time when the wireless communication device registered with the wireless network to determine the possession confidence metric.

19. The system of claim 15 wherein the location determination system configured to process the location request to determine the possession confidence metric comprises the location determination system configured to process a usage history of the wireless communication device to determine the possession confidence metric.

20. The system of claim 19 wherein the location determination system configured to process the usage history to determine the possession confidence metric comprises the location determination system configured to determine whether the wireless communication device established a communication session with the wireless network within a threshold amount of time before receiving the location request.

* * * * *